United States Patent [19]
Tedball

[11] 3,907,877
[45] Sept. 23, 1975

[54] PRECIPITATION OF SODIUM BENZOATE

[75] Inventor: Carole Anne Tedball, Sarnia, Canada

[73] Assignee: The Dow Chemical Company, Midland, Mich.

[22] Filed: Nov. 27, 1970

[21] Appl. No.: 93,484

[52] U.S. Cl.......... 260/515 R; 260/524 R; 260/525
[51] Int. Cl............................................. C07c 63/08
[58] Field of Search............ 260/515 R, 525, 524 R

[56] References Cited
UNITED STATES PATENTS
3,243,458  3/1966  Melchiore et al................... 260/525

Primary Examiner—James A. Patten
Attorney, Agent, or Firm—Ralph M. Mellom

[57] ABSTRACT

Sodium benzoate is precipitated from a solution of benzoic acid by adding a sodium alkoxide to form a granular precipitate which is easily filtered.

7 Claims, No Drawings

PRECIPITATION OF SODIUM BENZOATE

BACKGROUND OF THE INVENTION

An important process for making benzoic acid is the oxidation of toluene in the presence of a heavy metal oxidation catalyst. The liquid effluent of this process is essentially a toluene solution of benzoic acid, catalyst and small amounts of product representing intermediate stages of oxidation, such as benzaldehyde, benzyl alcohol and benzyl esters. Benzoic acid is conventionally isolated from this effluent by a multi-stage distillation procedure and then converted to alkali metal benzoate.

As specifically applied to the recovery of sodium benzoate, it has been found that sodium benzoate cannot be easily recovered by reacting benzoic acid in an aromatic hydrocarbon with a strong base. The product obtained from such a reaction is a slimy and unfilterable material which is extremely difficult to separate. As a result of the inability of the sodium hydroxide to react with the benzoic acid in toluene to form a desirable precipitate, a search has been conducted to determine a feasible method of recovering sodium benzoate from such a solution in an easily filterable form.

SUMMARY OF THE INVENTION

It has now been found according to the present invention that sodium benzoate is recovered in easily filterable form from the mixture of benzoic acid in an aromatic hydrocarbon solvent by adding sodium alkoxide to a solution, thereby forming a slurry of solid sodium benzoate in the aromatic hydrocarbon, and separating the sodium benzoate from the slurry. This isolation is readily carried out on a commercial scale at small expense.

Benzoic acid solutions in aromatic hydrocarbons such as benzene, toluene, or xylene are the by-product streams from various chemical processes. Such a solution, however, is most commonly encountered as the liquid effluent from toluene oxidation. This effluent contains benzoic acid, toluene, oxidation by-products and dissolved metal oxidation catalysts, ordinarily a cobalt compound, which is preferably removed from the solution prior to the precipitation.

The concentration of the benzoic acid in the liquid aromatic hydrocarbon may vary widely depending on the source. Generally, concentrations of about 5 to about 30 percent by weight of benzoic acid are found in the effluent streams, with about 5 to about 15 percent being especially suited to the invention. Such solutions readily lend themselves to crystal formation to give a granular precipitate which is easily filtered.

The sodium alkoxide of the present invention is conveniently and preferably prepared by reacting sodium hydroxide with an alkanol of up to about 10 carbon atoms. Alkoxides of 1 to 6 carbon atoms are preferred, with sodium methoxide being of special interest because of its availability and effectiveness. Substantial excesses of the alkanol are not desirable in the formation of the alkoxide since the benzoate is soluble in alcohols causing a reduced yield of the precipitate, but the precipitation is usually conducted in the presence of an excess of the alcohol corresponding to the alkoxide. A mixture of caustic and alcohol having a mole ratio of 1–10 moles of alcohol per mole of caustic is preferred, with ratios of about 1.5 to about 4 moles of alcohol per mole of caustic being especially preferred.

The amount of the sodium alkoxide reacted with the benzoic acid mixture is preferably that amount which stoichiometrically reacts with the benzoic acid. This amount, however, is not critical. For the reaction of less than a stoichiometric amount of sodium alkoxide, some benzoic acid is unreacted and remains unprecipitated. For an excess, sodium alkoxide impurities are introduced into the system which may be combined with the precipitate.

The temperature of precipitation may be varied widely. Preferred temperatures are about 10° to about 75°C. with especially good results being obtained with temperatures of about 25° to about 60°C. At higher temperatures, the alcohol tends to evaporate under normal atmospheric conditions. To prevent this loss, however, pressure may be employed.

Under the reaction conditions, a preferred reaction time is about 5 to about 30 minutes. During this time the reaction mixture is stirred, but extended or vigorous stirring of the benzoic acid-sodium alkoxide mixture in some cases forms a less granular precipitate.

By the use of the present invention, the sodium benzoate is obtained from an aromatic hydrocarbon solvent in a granular form which is conventionally separated on a commercial scale by simple filtration.

SPECIFIC EMBODIMENTS

EXAMPLE 1

Sodium Methoxide in Methanol-Water

To 750 g. of the reaction mass from a toluene oxidation reaction which contained 13% benzoic acid in toluene along with minor by-products from the oxidation was added 29 g. of 72 percent sodium hydroxide solution which had been previously mixed with 75 g. of methanol. The reactor mass was being held at a temperature of 46°C. when the methanol-caustic mixture having a temperature of 66°C. was added to it. The temperature rose over a minute to about 60°C. and quickly cooled to 56°C. The mixture was gently stirred with a stirring rod and held for approximately 10 minutes with only occasional stirring before filtration. With an Eimco twill NY-518F filter cloth, the filtration rate was 3.16 gallons per square foot per minute. In a parallel experiment using caustic alone the filtration rate was unacceptably low, <1 gallon per square foot per minute. The product was identified as the desired sodium benzoate.

EXAMPLE 2

Sodium Methoxide in Methanol-Toluene

In the same manner as described by Example 1, caustic fines were added to an azeotropic mixture of 70/30 percent by volume methanol/toluene solution to give 1 mole of sodium hydroxide per mole of methanol. In the same manner as Example 1, this mixture was added to the toluene reactor mass to give a readily filterable precipitate of sodium benzoate.

EXAMPLE 3

Sodium Methoxide in Methanol

Caustic fines were added to methanol to give 1 mole of caustic per 10 moles of methanol. In the same manner as Example 1, this mixture was added to the toluene reactor mass to give a readily filterable sodium benzoate product. The yield, however, was lower due to the solubility of the benzoic acid in the methanol.

EXAMPLE 4

Sodium Ethoxide in Ethanol

In the same manner as shown by the examples above, caustic fines were added to ethanol to give 1 mole of caustic per mole of ethanol. This mixture was added to the toluene reactor mass at room temperature to give a readily filterable sodium benzoate product.

EXAMPLE 5

Sodium Butoxide

In the same manner as described by the examples above, caustic fines were reacted with butanol to give a solution having 1 mole of caustic per mole of butanol. This solution was added to the toluene reactor mass at room temperature to give a readily filterable sodium benzoate product.

EXAMPLE 6

Dry Sodium Methoxide

In the same manner as described above, dry sodium methoxide was added to the toluene reactor mass. A fine precipitate was obtained which filtered better than the sodium hydroxide alone but was not as good as sodium methoxide in methanol.

In the same manner as described by the examples above, sodium hydroxide may be reacted with other alkanols, such as isopropyl alcohol, t-butyl alcohol, hexanol, octanol or dodecanol, to give a sodium alkoxide which may then be reacted with the benzoic acid in an aromatic hydrocarbon solvent, such as toluene, benzene or xylene, to give a sodium benzoate product which is easily filterable.

I claim:

1. In a process for preparing sodium benzoate from benzoic acid wherein the benzoic acid is obtained by the heavy metal oxidation of toluene and the benzoic acid is present in solution, the improvement comprising adding a sodium alkoxide to the solution to produce a slurry containing solid sodium benzoate in granular form and filtering the slurry to recover the granular sodium benzoate.

2. The process of claim 1 wherein the solution contains 5 to 30 percent by weight of benzoic acid.

3. The process of claim 2 wherein the concentration of the benzoic acid in solution is 5 to 15 percent by weight.

4. The process of claim 1 wherein the alkoxide contains 1 to 6 carbon atoms.

5. The process of claim 1 wherein the alkoxide is sodium methoxide.

6. The process of claim 1 wherein the temperature is about 10° to about 75°C.

7. A process according to claim 1 wherein the sodium alkoxide is previously prepared by contacting sodium hydroxide and an alkanol having up to 10 carbon atoms per molecule in a mole ratio between 1 to 10 moles of alkanol per mole of sodium hydroxide.

* * * * *